(12) United States Patent
Imai et al.

(10) Patent No.: US 8,594,890 B2
(45) Date of Patent: Nov. 26, 2013

(54) LANE DEPARTURE WARNING DEVICE

(75) Inventors: Masato Imai, Hitachinaka (JP); Takashi Okada, Hitachinaka (JP); Masao Sakata, Warabi (JP)

(73) Assignee: Clarion Co., Ltd., Saitama-shi (JP)

( * ) Notice: Subject to any disclaimer, the term of this patent is extended or adjusted under 35 U.S.C. 154(b) by 33 days.

(21) Appl. No.: 13/523,271

(22) Filed: Jun. 14, 2012

(65) Prior Publication Data

US 2012/0320210 A1    Dec. 20, 2012

(30) Foreign Application Priority Data

Jun. 17, 2011    (JP) .................................. 2011-135482

(51) Int. Cl.
*G06F 19/00* (2011.01)
(52) U.S. Cl.
USPC ...... 701/41; 701/1; 701/45; 701/70; 701/117; 701/301; 340/425.5; 340/435; 340/436; 340/438; 340/575; 348/118; 348/119; 348/120; 348/148; 382/104; 382/199; 180/167; 250/208.1
(58) Field of Classification Search
USPC ................... 701/1, 41, 45, 70, 117, 301, 417; 340/425.5, 435, 436, 438, 439, 575, 340/576, 901, 903, 904, 905, 937; 348/118, 348/119, 120, 148; 382/104, 199; 180/167; 250/208.1
See application file for complete search history.

(56) References Cited

U.S. PATENT DOCUMENTS

| 6,876,298 B2 * | 4/2005 | Litkouhi et al. .............. 340/435 |
| 2004/0042638 A1 | 3/2004 | Iwano |
| 2007/0069874 A1 | 3/2007 | Huang et al. |
| 2008/0186154 A1 | 8/2008 | Haug |
| 2008/0258884 A1 | 10/2008 | Schmitz |

(Continued)

FOREIGN PATENT DOCUMENTS

| JP | 2004-145852 A | 5/2004 |
| JP | 2010-78387 A | 4/2010 |

(Continued)

OTHER PUBLICATIONS

Japanese Office Action with translation dated Jun. 11, 2013 (Seven (7) pages).

(Continued)

*Primary Examiner* — McDieunel Marc
(74) *Attorney, Agent, or Firm* — Crowell & Moring LLP

(57) ABSTRACT

It is an object to provide a lane departure warning device capable of generating almost no false warning if a driver performs an avoiding operation of a lane departure. The lane departure warning device estimates the steering amount of the own vehicle toward the center of the lane or the amount correlating with this steering amount based on the parameter representing the vehicle behavior such as the steering angle, the yaw rate and the lateral G, thereby detecting the state of the vehicle steering toward the center of the lane when a driver is performing an avoiding operation to avoid the lane departure (quick steering), and determining whether or not the possibility of the vehicle's departure from the lane is high without using the time TLC and its threshold value Ts, but only based on the determination whether or not the distance D1 or D2 from the outer edge of the front wheel to the marking line is less than the threshold value Ds if the driver performs the avoiding operation to avoid the lane departure (quick steering).

6 Claims, 11 Drawing Sheets

(56) References Cited

U.S. PATENT DOCUMENTS

| | | | |
|---|---|---|---|
| 2011/0074955 A1* | 3/2011 | Kuehnle | 348/148 |
| 2011/0115912 A1* | 5/2011 | Kuehnle | 348/148 |
| 2011/0169958 A1 | 7/2011 | Imai et al. | |
| 2011/0187863 A1* | 8/2011 | Glander et al. | 348/148 |
| 2012/0033074 A1* | 2/2012 | Spangenberg | 348/148 |
| 2012/0212353 A1* | 8/2012 | Fung et al. | 340/905 |
| 2012/0212612 A1* | 8/2012 | Imai et al. | 348/148 |
| 2012/0327233 A1* | 12/2012 | Imai et al. | 348/148 |
| 2013/0063599 A1* | 3/2013 | Imai et al. | 348/148 |

FOREIGN PATENT DOCUMENTS

| | | |
|---|---|---|
| JP | 2010-191893 A | 9/2010 |
| JP | 2010-224788 A | 10/2010 |
| JP | 2012-171562 A | 9/2012 |
| WO | WO 2005/023588 A1 | 3/2005 |

OTHER PUBLICATIONS

Extended European Search Report dated Oct. 12, 2012 (three (3) pages).

* cited by examiner (a)

(b)

LANE DEPARTURE WARNING DEVICE

BACKGROUND OF THE INVENTION

1. Field of the Invention

The present invention relates to a lane departure warning device, for example, a lane departure warning device for detecting positions of traffic marking lines of a lane where an own vehicle is traveling by using an image pickup device (on-board camera), predicting a possibility of departure of the own vehicle from the lane, and providing a warning if the predicted possibility of departure is high.

2. Background Art

There have been suggested various techniques of recognizing objects (such as vehicles and pedestrians) or traffic markings and signs (road paintings such as a traffic marking line, and traffic signs such as a Stop sign) in an image of surroundings of the own vehicle picked up by an on-board camera of the own vehicle. For example, if traffic marking lines such as white lines painted on a road and Botts' dots can be detected by an on-board camera so that a vehicle position in the lane, that is, a relative position of the vehicle to the traffic marking lines can be found, it is possible to predict how high the possibility of the vehicle's departure from the lane is, and if the possibility of the departure is high, a warning is provided for a driver or steering and braking are controlled, thereby preventing the departure from the lane in advance or reducing the degree of such departure.

Examples of the above mentioned systems for providing a warning when there is a high possibility that a vehicle is likely to depart from a lane are lane departure warning systems (LDWS) standardized by JIS D0804 of JIS (Japan Industrial Standard) and by ISO/DIS 17361 of ISO (International Organization for Standardization).

As a technique to realize such systems, JP Patent Publication (Kokai) No. 2010-191893A discloses a device that recognizes traffic marking lines in the vicinity of a vehicle based on a picked up image, calculates a distance from each end of the own vehicle to each traffic marking line, and provides a warning if the distance is less than a predetermined value, or predicts TLC (Time to Line Crossing) that is time required for the own vehicle to depart from a traveling lane and if this predicted TLC is less than a predetermined time.

Unfortunately, the lane departure warning device disclosed in JP Patent Publication (Kokai) No. 2010-191893A sometimes provides lane departure warning when a value of the TLC becomes less than the predetermined time even though the vehicle about to depart from the lane is avoiding the lane departure by a quick steering immediately before the lane departure (before the distance to the traffic marking line becomes less than a predetermined value). This is because calculation of image recognition is usually delayed from a vehicle behavior, and the device sometimes provides a warning although a driver is intentionally avoiding the lane departure, and the driver may feel it irritated. Hence, such a warning is categorized into a false warning. A false warning is most likely to occur in a device configured to pick up an image behind a vehicle and provide a lane departure warning using the picked up image.

SUMMARY OF THE INVENTION

The present invention has been made in the light of the above mentioned facts, and has an object to provide a lane departure warning device capable of generating almost no false warnings when a driver performs a lane departure avoiding operation, or the like.

In order to realize the above object, the lane departure warning device according to the present invention detects a position of a marking line of a lane where an own vehicle is traveling, predicts a possibility that the own vehicle will depart from the lane, and provides a warning if the possibility of the departure is high, and the lane departure warning device includes: a marking line detection section for detecting the position of the marking line based on image information acquired from an image pickup device mounted on the own vehicle; a distance estimation section for estimating a distance from a predetermined part of the own vehicle to the marking line; a required time estimation section for estimating a time required for the own vehicle to depart from the lane; a vehicle behavior estimation section for estimating steering amount of the own vehicle toward a center of the lane or amount correlating with the steering amount based on a parameter for expressing a vehicle behavior of at least one of a steering angle, a yaw rate and a lateral G; a departure possibility determination unit for determining whether or not the possibility that the own vehicle will depart from the lane is high based on the distance from the own vehicle to the marking line that is estimated by the distance estimation section, the time required for the own vehicle to depart from the lane that is estimated by the required time estimation section, and the steering amount or the amount correlating with the steering amount that is estimated by the vehicle behavior estimation section; and a warning generator for providing a warning if it is determined by the determination unit that the possibility that the own vehicle will depart from the lane is high.

The lane departure warning device according to the present invention estimates the steering amount of the own vehicle toward the center of the lane or the amount correlating with this steering amount based on the parameter representing the vehicle behavior such as the steering angle, the yaw rate and the lateral G, thereby detecting the state of the vehicle steering toward the center of the lane when a driver is performing an avoiding operation to avoid the lane departure (quick steering), and determining whether or not the possibility of the vehicle's departure from the lane is high without using the time TLC, but only based on the distance from the outer edge of the front wheel to the marking line if the driver performs the avoiding operation to avoid the lane departure (quick steering); accordingly, it is possible to generate almost no false warning, thereby enhancing the sense of security and reliability for a driver.

DETAILED DESCRIPTION OF THE PREFERRED EMBODIMENTS

Hereinafter, descriptions will be provided on embodiments of the present invention with reference to the drawings.

Figure 1:
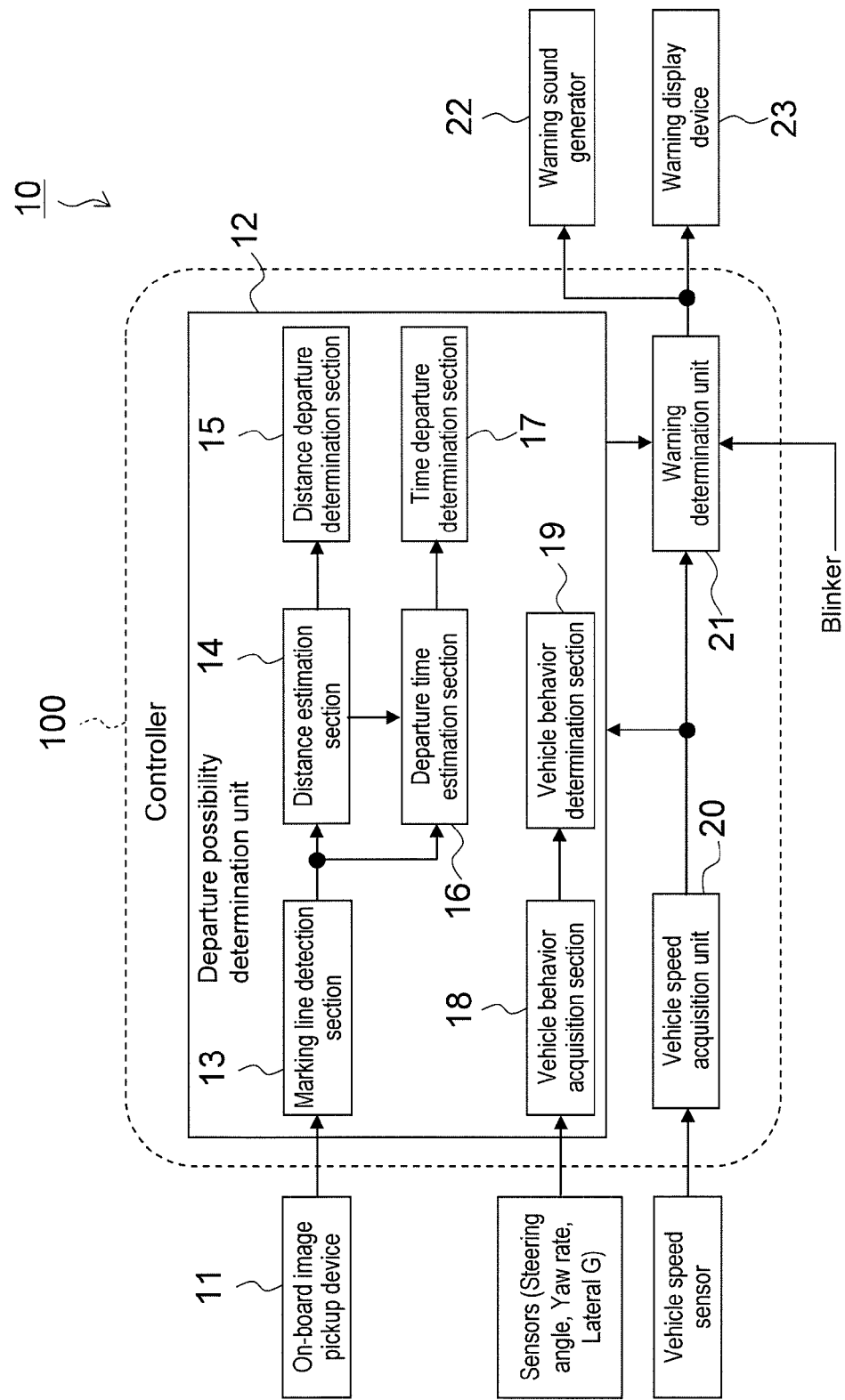
FIG. 1 is a schematic diagram illustrating one embodiment (first embodiment) of the lane departure warning device according to the present invention.

FIG. 1 is a schematic diagram illustrating one embodiment (first embodiment) of the lane departure warning device according to the present invention.

First Embodiment

The lane departure warning device 10 of the first embodiment includes a controller 100 as a control center, which comprises a microcomputer, as illustrated in the drawing, and the controller 100 includes: the departure possibility determination unit 12 including the marking line detection section 13, the distance estimation section 14, the distance departure determination section 15, the departure time estimation section 16, the time departure determination section 17, the vehicle behavior acquisition section 18 and the vehicle behavior determination section 19; the vehicle speed acquisition unit 20; and the warning determination unit 21, as illustrated in the functional block diagram.

The lane departure warning device 10 is configured to receive an image picked up by the image pickup device 11, and also receives sensor values used for estimating steering amount of the vehicle such as a steering angle, a yaw rate and a lateral acceleration (lateral G) on the vehicle behavior acquisition section 18 and also on the vehicle behavior (steering amount) determination section 19, and receives a vehicle speed sensor value on the vehicle speed acquisition unit 20, and then outputs a warning issuing instruction to the warning sound generator 22 and the warning display device 23 if it is determined by the warning determination unit 21 that there is a high possibility that the own vehicle will depart from the lane where the own vehicle is traveling.

The image pickup device 11 picks up an image of the outside of the own vehicle by using an image pickup sensor such as a CCD (charge coupled device) image sensor and a CMOS (complementary metal oxide semiconductor) image sensor, outputs acquired image as analogue data or converts the acquired image into digital steps as image data available on a computer, and outputs this data to (the marking line detection section 13 of) the controller 100 through a dedicated line or the like.

The marking line detection section 13 uses the image data (image information) of the outside of the own vehicle picked up by the on-board image pickup device 11 so as to detect marking lines [a center line, lane lines (such as a pair of right and left lane lines) and outer lane lines], which are made of white lines and Botts' dots painted on the road using a solid line, a broken line or sequence of points.

The distance estimation section 14 corrects a distance between each marking line detected by the marking line detection section 13 and the image pickup device 11 into a distance between a predetermined part (such as an outer edge of the front wheel) of the vehicle and the marking line.

The distance departure determination section 15 determines that the possibility of departure is high if the distance between the predetermined part of the own vehicle and the marking line, which is estimated by the distance estimation section 14, becomes equal to a predetermined threshold value ds for distance determination or less.

The departure time estimation section 16 estimates time required for the vehicle to depart from the lane (TLC: time to line crossing).

The time departure determination section 17 determines that the possibility of departure is high if the departure time TCL estimated by the departure time estimation section 16 becomes equal to a predetermined threshold value Ts for time determination or less.

The vehicle behavior acquisition section 18 estimates steering amount of the own vehicle or amount correlating with this steering amount based on parameters representing vehicle behaviors such as a steering angle, a yaw moment, a lateral acceleration and others detected by the steering angle sensor, the yaw rate sensor, the lateral G sensor and other devices that are mounted on the own vehicle. The above sensor values are acquired through communication means such as a dedicated line and in-vehicle LAN (local area network).

The vehicle behavior determination section 19 determines whether or not the steering amount of the own vehicle or the amount correlating with the steering amount (such as change amount of the lateral G; in other words, the lateral acceleration obtained by differentiating the lateral G) acquired by the vehicle behavior acquisition section 18 is equal to a predetermined value or more.

The vehicle speed acquisition unit 20 acquires information regarding the vehicle speed from external means through the communication means such as the dedicated line and the in-vehicle LAN (LocalArea network).

The departure possibility determination unit 12 determines whether or not the possibility that the own vehicle will depart from the marking line is high. The lane departure determination on this unit is supposed to be in conformity to the JIS standard (JIS D 0804) or ISO standard (ISO/DIS 17361).

The warning determination unit 21 outputs a warning issuing instruction to the warning sound generator 22 and the warning display device 23 using the communication means such as the in-vehicle LAN and the dedicated line if it is determined by the departure possibility determination unit 12 that the possibility of the vehicle's departure from the marking line is high and also if there is no warning restriction condition. The warning restriction condition may be such that a vehicle speed should be set at a predetermined value or less (70 cm/h or less, for example) during a blinking operation or within a predetermined time (2 seconds, for example) after a blinking operation or the like, for example.

The warning sound generator 22 includes a speaker for warning a driver with a sound based on the output from the warning determination unit 21.

The warning display device 23 includes a display, a meter panel, a warning lamp and other components so as to visually warn a driver based on the output from the warning determination unit 21.

Descriptions will now be provided on the steps executed by the lane departure warning device 10 of the first embodiment.

Figure 2:
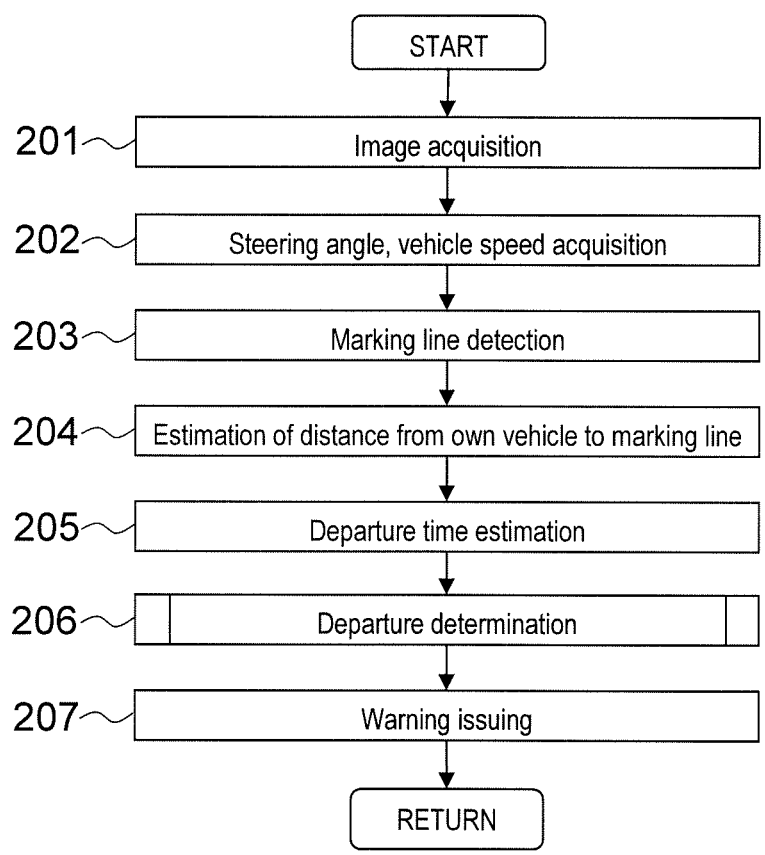
FIG. 2 is a flow chart provided for explaining a basic procedure of the first embodiment.

FIG. 2 is a flow chart showing one example of the program (procedure) executed by the controller 100 of the lane departure warning device 10.

In Step 201, the image picked up by the image pickup device 11 is converted into digital steps and is acquired as image data. If the image is already digitalized on the image pickup device 11, this image data is directly acquired.

In Step 202, the steering angle and the vehicle speed are acquired from the steering angle sensor, the vehicle speed sensor or the like through the communication means such as the in-vehicle LAN, and are stored on the RAM or the like in the controller 100, for example. In this case, a method of acquiring the steering angle is explained, but parameters regarding the steering amount of the vehicle such as the yaw rate and the lateral G may be acquired, instead. In addition, instead of acquiring the vehicle speed directly, another method of acquiring wheel speed or the like and converting the wheel speed into the vehicle speed may be employed.

Figure 3:
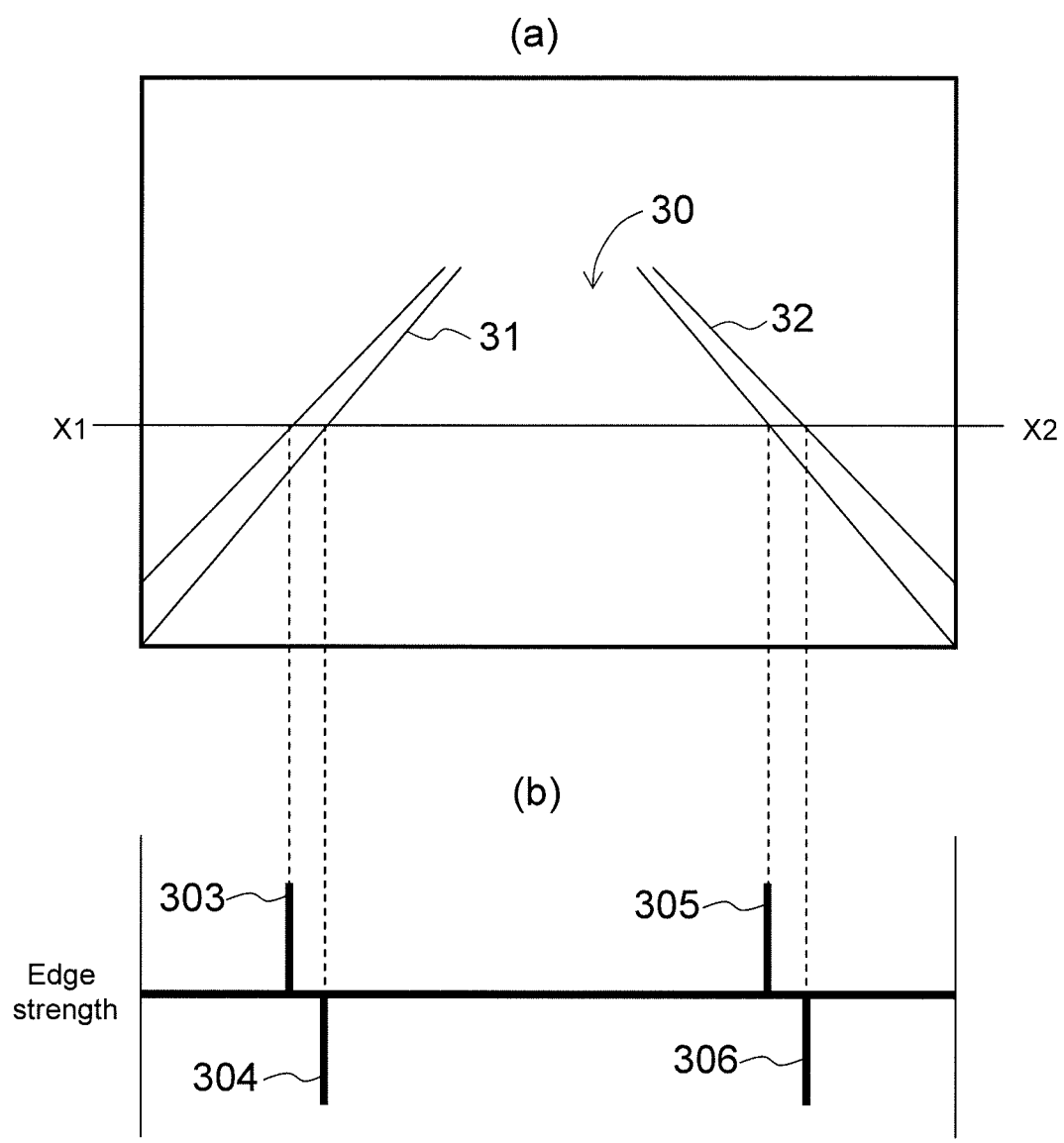
FIG. 3 is a drawing provided for explaining a marking line detection.

In Step 203, the marking line painted on the road is detected from the image data acquired in Step 201. A specific method to detect this marking line will be described with reference to FIG. 3. FIG. 3(a) illustrates image data acquired in Step 201, in which there are two marking lines 31, 32. One of methods of detecting these marking lines 31, 32 is a method to extract marking lines by calculating edge strengths in an image. An edge denotes a point at which brightness drastically changes in an image. FIG. 3(b) illustrates the results of edge strengths detected from X1 to X2 of FIG. 3(a), the peaks 303, 305 are points where the road changes to the respective marking lines (points at which the brightness changes drastically from "dark" to "bright"), and the peaks 304, 306 are points where the respective marking lines change to the road (points at which the brightness changes drastically from "bright" to "dark"). In this way, the marking lines can be detected by finding the combination of 303 and 304 and the combination of 305 and 306. The distance between the marking line and the optical axis of the image pickup device 11 (distance to the marking line) is calculated.

Figure 4:
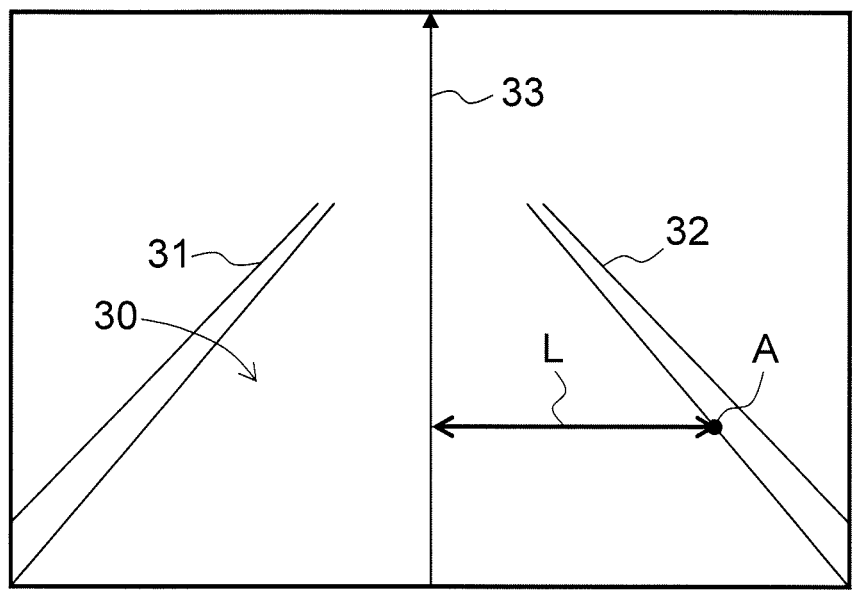
FIG. 4 is a drawing provided for explaining a distance to the marking line.
Figure 4:
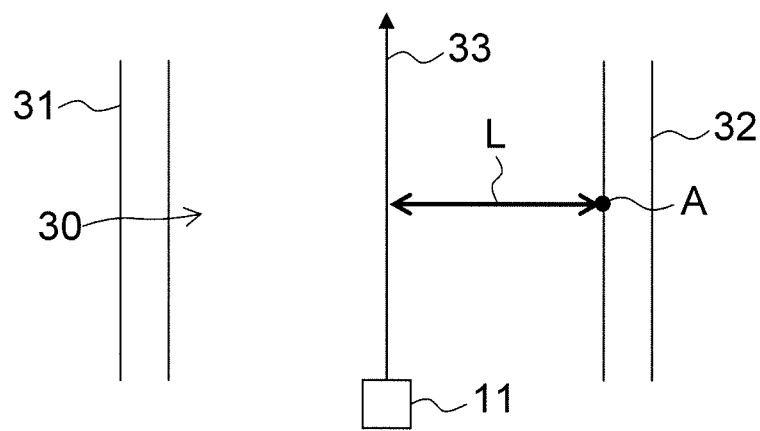

Specific descriptions will now be provided on the steps of calculating the distance to the marking line with reference to FIG. 4. FIG. 4(a) illustrates image data acquired in Step 201, as similar to FIG. 3(a), and FIG. 4(b) is a bird's eye view in the same situation of FIG. 4(a). In this case, there are two marking lines 31, 32, and the arrow 33 denotes the optical axis of the image pickup device 11. The distance L from the optical axis 33 to the point A of the marking line 32 is used as the distance to the marking line 32, for example. The distance L to the marking line is calculated in such a manner that the coordinates of the point A in FIG. 4(a) are found based on the peak of the edge strength, and then the coordinates of the point A in FIG. 4(a) are converted into real coordinates in FIG. 4(b). As the distance to the marking line, instead of using the coordinates of the point A located at the inner edge of the marking line as described above, the coordinates at an outer edge of the marking line or coordinates at the center of the marking line may be used as far as the same definition is employed in a consistent manner. In addition, when finding the distance to the marking line, instead of using one calculation relative to each marking line in the image, plural calculations (10 calculations, for example) relative to each marking line may be used.

Next, in Step 204, the distance of each predetermined part of the own vehicle to each marking line is estimated based on the marking line detected in Step 203 and the distance L between the optical axis of the image pickup device 11 and each marking line. In the JIS standard (JIS D 0804) and the ISO standard (ISO/DIS 17361), in order to determine whether or not a warning should be activated based on the distance from the outer edge of the front wheel of the vehicle to the marking line, the distance from the optical axis to the marking line that is detected from the image behind the vehicle picked up by the image pickup device 11 is required to be corrected into the distance from the outer edge of the front wheel of the vehicle to the marking line. Specific descriptions of this will be provided with reference to FIG. 5.

Figure 5:
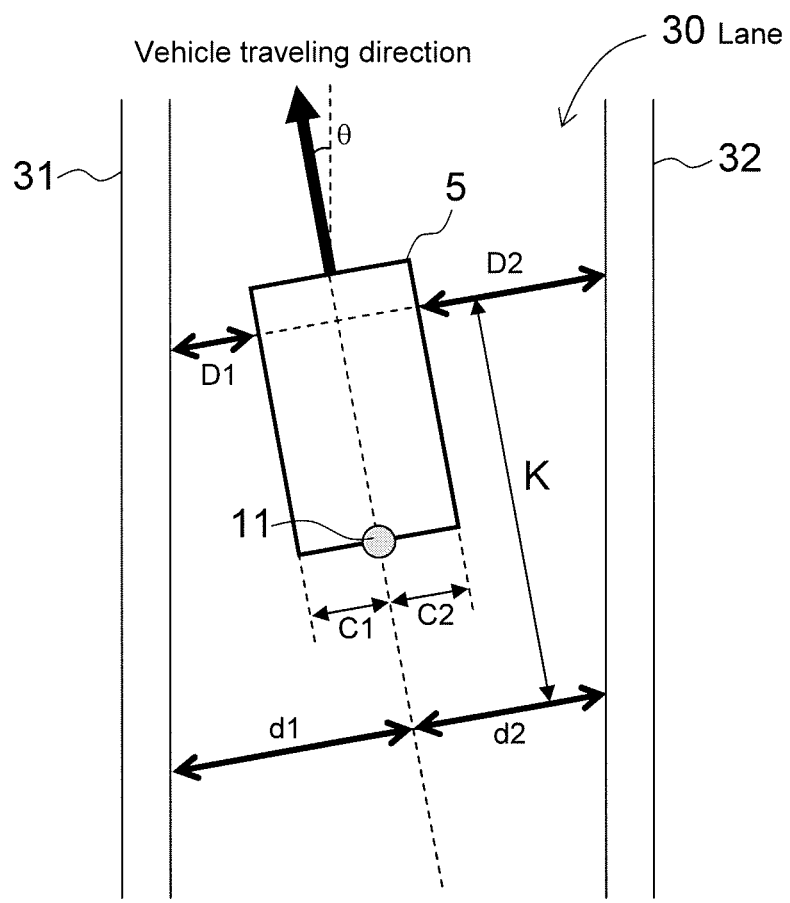
FIG. 5 is a drawing provided for explaining one example of a method of correcting a measurement result of an image pickup device for picking up an image behind a vehicle into a position of a front wheel.

In FIG. 5, it is supposed that the vehicle 5 is traveling on a road having two marking lines 31, 32.

Correction of the distance d1 to the left marking line that is calculated on the image pickup device 11 mounted at the rear of the vehicle into the distance D1 from the outer edge of the left front wheel of the vehicle to the left marking line (corrected distance to the marking line) can be calculated by Formula (1), using the distance K from the position where the distance d1 to the left marking line is calculated to the front wheel of the vehicle, the distance C1 from the image pickup device 11 to the outer edge of the left wheel of the vehicle, and the vehicle yaw angle θ.

$$D1 = d1 - K \times \tan\theta - C1 \tag{1}$$

Similarly, correction of the distance d2 to the right marking line that is calculated on the image pickup device 11 mounted at the rear of the vehicle into the distance D2 from the outer edge of the right front wheel of the vehicle to the right marking line (corrected distance to the marking line) can be calculated by Formula (2), using the distance K from the position where the distance d2 to the right marking line is calculated to the front wheel of the vehicle, the distance C2 from the image pickup device 11 to the outer edge of the right wheel of the vehicle, and the vehicle yaw angle θ.

$$D2 = d2 + K \times \tan\theta - C2 \tag{2}$$

The vehicle yaw angle θ may be found by using the least-squares method that uses information regarding plural past locations of the distances d1, d2 to the right and left marking lines, or by employing a method of directly calculating the angles of the marking lines from one picked up image.

In Step 205, the time required for the outer edge of the front wheel of the own vehicle to depart from the marking line is estimated based on the corrected distance to the marking line that is estimated in Step 204. Specifically, the departure time TLC1 relative to the marking line on the left of the own vehicle can be calculated by Formula (3) using the distance D1 from the outer edge of the left front wheel of the vehicle to the left marking line, and the traveling speed (lateral speed) LV1 in the vertical direction to the lane.

$$TLC1 = D1/LV1 \tag{3}$$

Similarly, the departure time TLC2 relative to the marking line on the right of the own vehicle can be calculated by Formula (4) using the distance D2 from the outer edge of the right front wheel of the vehicle to the right marking line, and the traveling speed (lateral speed) LV2 in the vertical direction to the lane.

$$TLC2 = D2/LV2 \tag{4}$$

The lateral speeds LV1, LV2 may be found based on the changes of the distance D1 from the outer edge of the left front wheel of the vehicle to the left marking line and of the distance D2 from the outer edge of the right front wheel of the vehicle to the right marking line, or may be found by converting the vehicle yaw angle θ.

Next, in Step 206, it is determined whether or not the possibility that the own vehicle will depart from the lane is high, using the information regarding the steering angle and the vehicle speed acquired in Step 202, the corrected distance to the marking line that is estimated in Step 204, and the departure speed estimated in Step 205. The specific procedure will be described with reference to the flow chart of FIG. 6.

In Step 601, the steering amount of the vehicle is calculated by using the information regarding the steering angle acquired in Step 202. In this step, the lateral G is calculated based on the steering angle, and the change amount of the lateral G (lateral acceleration obtained by differentiating the lateral G) is used so as to express the steering of the vehicle. The change amount LGd of the lateral G can be calculated by Formula (5), using the previous calculated value LGz1 of the lateral G, the vehicle speed VSP, the steering angle STR, the vehicle wheelbase WB and the stability factor SF.

$$LGd=LGz1-VSP2 \times STR/WB/(1+SF \times VSP2) \quad (5)$$

Note that each vehicle has each different stability factor SF as a parameter (see "Vehicle Dynamics and Control" by Masato Abe, Sankaido Publishing Co., Ltd.).

In Step 602, it is determined whether or not the steering amount toward the center of the lane (change amount of the lateral G) calculated in Step 601 is equal to a predetermined value or more (0.2G/s or more, for example), and if the steering amount (change amount of the lateral G) is equal to the predetermined value or less, the process shifts to Step 605 to determine whether or not the counter (elapsed time: default value of 0) is equal to the predetermined value or less (0.5 seconds or less, for example), and if the counter is equal to the predetermined value or less, the process shifts to Step 606 to increment the counter (α seconds/increment) and then the process shifts to Step 608, but if the counter exceeds the predetermined value, the process shifts to Step 607 to set the in-steering flag to OFF, and then the process shifts to Step 608.

In Step 602, if it is determined that the steering amount (change amount of the lateral G) is equal to the predetermined value or more, the process shifts to Step 603 to set the in-steering flag to ON, and the counter is reset in following Step 604, and then the process shifts to Step 608.

In Step 608, it is determined whether or not the in-steering flag is set to ON, and if the in-steering flag is set to ON, the process shifts to Step 609 to determine whether or not the possibility of the own vehicle's departure from the lane is high, using the distance from the outer edge of the front wheel to the marking line that is estimated in Step 204. Specifically, it is determined whether or not the distance D2 (or D1) from the outer edge of the front wheel to the marking line is less than the predetermined threshold value Ds for distance determination (D2<Ds), and if the distance D2 is determined to be D2<Ds, the possibility of the own vehicle's departure from the lane is high, so that the process shifts to Step 610 to output the warning issuing instruction, and then shifts to "Return". In Step 609, if the distance D2 is determined not to be D2<Ds, the probability of the own vehicle's departure from the lane is low, so that the process skips Step 610 and shifts to "Return".

On the other hand, in Step 608, if the in-steering flag is determined to be set to OFF (no steering operation toward the center of the lane is carried out, or the like), the process shifts to Step S611 to determine, using the distance D2 (or D1) from the outer edge of the front wheel to the marking line estimated in Step 204 and the threshold value Ds, whether or not the distance D2 from the outer edge of the front wheel to the marking line is less than the threshold value Ds (D2<Ds), as similar to Step 609, and if the distance D2 is determined to be D2<Ds, the possibility of the own vehicle's departure from the lane is high, so that the process shifts to Step 610 to output the warning issuing instruction, and thereafter shifts to "Return".

In step 611, if the distance D2 is determined not to be D2<Ds, the possibility of the own vehicle's departure from the lane is low, so that the process shifts to Step 612 to determine whether or not the departure time TLC is less than the predetermined threshold value Ts for time determination. In this step, if the departure time TLC is determined to be TLC<Ts, the possibility of the own vehicle's departure from the lane is high, the process shifts to Step 610 to output the warning issuing instruction, and thereafter shifts to "Return". In Step 612, if the departure time TLC is determined not to be TLC<Ts, the possibility of the own vehicle's departure from the lane is low, so that the process skips Step 610 and shifts to "Return".

Step 609 and Step 611 have the same process; specifically, in which it is determined that the possibility of the departure is high if the distance D1 or D2 from the outer edge of the front wheel to the marking line estimated in Step 204 is equal to the threshold value Ds or less (5 cm or less, for example).

In Step 612, it is determined that the possibility of the departure is high if the time TLC required for the departure estimated in Step 205 is equal to the threshold value Ts or less (0.5 s or less, for example).

Note that the process from Step 601 to Step 612 is carried out for the right marking line and for the left marking line, respectively.

In step 207, if it is determined that the possibility of the departure from the marking line is high in Step 206, the warning generation process is executed using the warning sound generator 22 and the warning display device 23, and then this routine is completed. The timing to release the warning is set at predetermined time later than the warning starts up (two seconds later, for example).

In the present embodiment, the steering angle is used as the parameter for estimating the steering amount of the vehicle, but the yaw rate or the lateral G may also be used as the parameter for estimating the steering amount of the vehicle, and information regarding the yaw rate may be obtained from output values of the yaw rate sensor, and information regarding the lateral G may be obtained from output values of the lateral G sensor.

As described above, the lane departure warning device 10 according to the first embodiment is configured to estimate the steering amount of the own vehicle toward the center of the lane or the amount correlating with the steering amount based on the parameter representing the vehicle behavior such as the steering angle, the yaw rate and the lateral G, thereby detecting the state of the vehicle steering toward the center of the lane when a driver is performing an avoiding operation to avoid the lane departure (quick steering), and determining whether or not the possibility of the vehicle's departure from the lane is high without using the time TLC and its threshold value Ts, but only based on the determination whether or not the distance D1 or D2 from the outer edge of the front wheel to the marking line is less than the threshold value Ds if the driver performs the avoiding operation to avoid the lane departure (quick steering); accordingly, it is possible to generate almost no false warning, thereby enhancing sense of security and reliability for a driver.

Descriptions will now be provided on the first embodiment applied to the actual road conditions.

FIG. 7(A) illustrates a scene where the vehicle 5 is traveling along a straight road (lane) 30 with describing the track 43, and (B), (C), (D) and (F) represent how the distance D2 to the right marking line, the TLC, the steering angle, the change amount of the lateral G and the in-steering flag respectively change in the scene of (A).

The triangle area 41 extending behind the vehicle 5 in FIG. 7(A) represents the image pickup range of the image pickup device 11 mounted at the center of the rear of the vehicle 5.

Ds in (B) denotes the threshold value for distance determination, Ts in (C) denotes the threshold value for time determination, and Gs in (E) denotes the threshold value for steering amount (change amount of the lateral G) determination.

When the vehicle 5 approaches the right marking line 32 and passes the position M1, both the distance D2 to the right marking line and the TLC become smaller. Thereafter, when the driver steers the vehicle to return toward the center of the lane 30, the steering angle is changed to the plus region as illustrated in (D), and the change amount of the lateral G calculated using the steering angle is also significantly changed to the plus region.

When the vehicle 5 reaches the position M2, the change amount of the lateral G exceeds the threshold value Gs ("YES" in Step 602 in FIG. 6), and then the in-steering flag is set to ON, so that only result of the departure determination based on the distance D2 to the marking line 32 will be output if this flag is set to ON ("YES" in Step 608).

When the vehicle reaches the position M3, the TLC becomes less than the threshold value Ts, which is ignored because the in-steering flag is set to ON.

Thereafter, when the vehicle reaches the position M5, the determination result in Step 605 becomes "NO", and then the in-steering flag becomes to OFF.

As described above, the driver's intention of trying to return to the center of the lane 30 is taken into account based on the steering amount (change amount of the lateral G), but the possibility of the vehicle's departure is not determined based on the departure time TLC, thereby preventing generation of unnecessary warnings.

Figure 7:
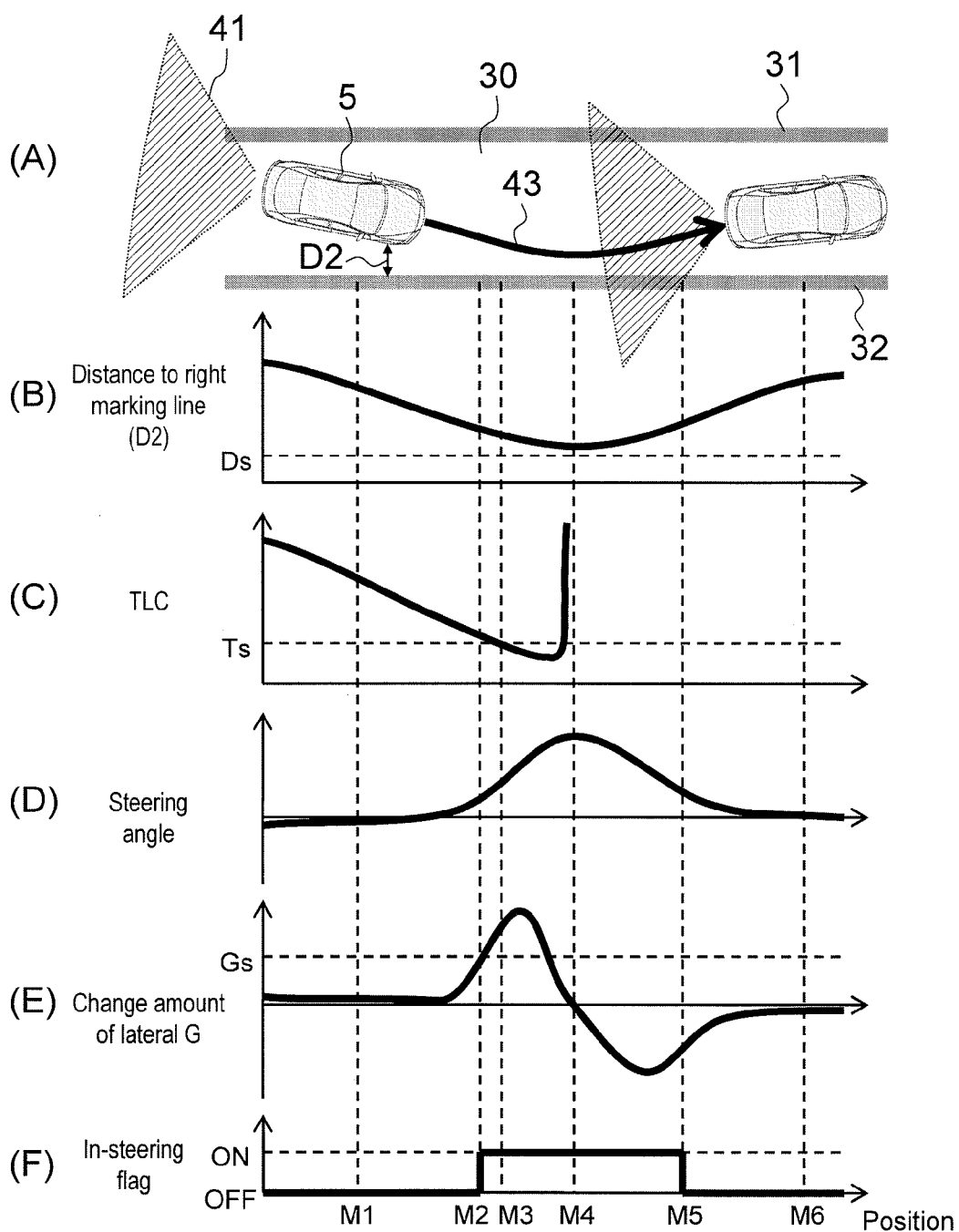
FIG. 7 is a diagram provided for explaining one example of behavior and change of each component in the first embodiment.
Figure 8:
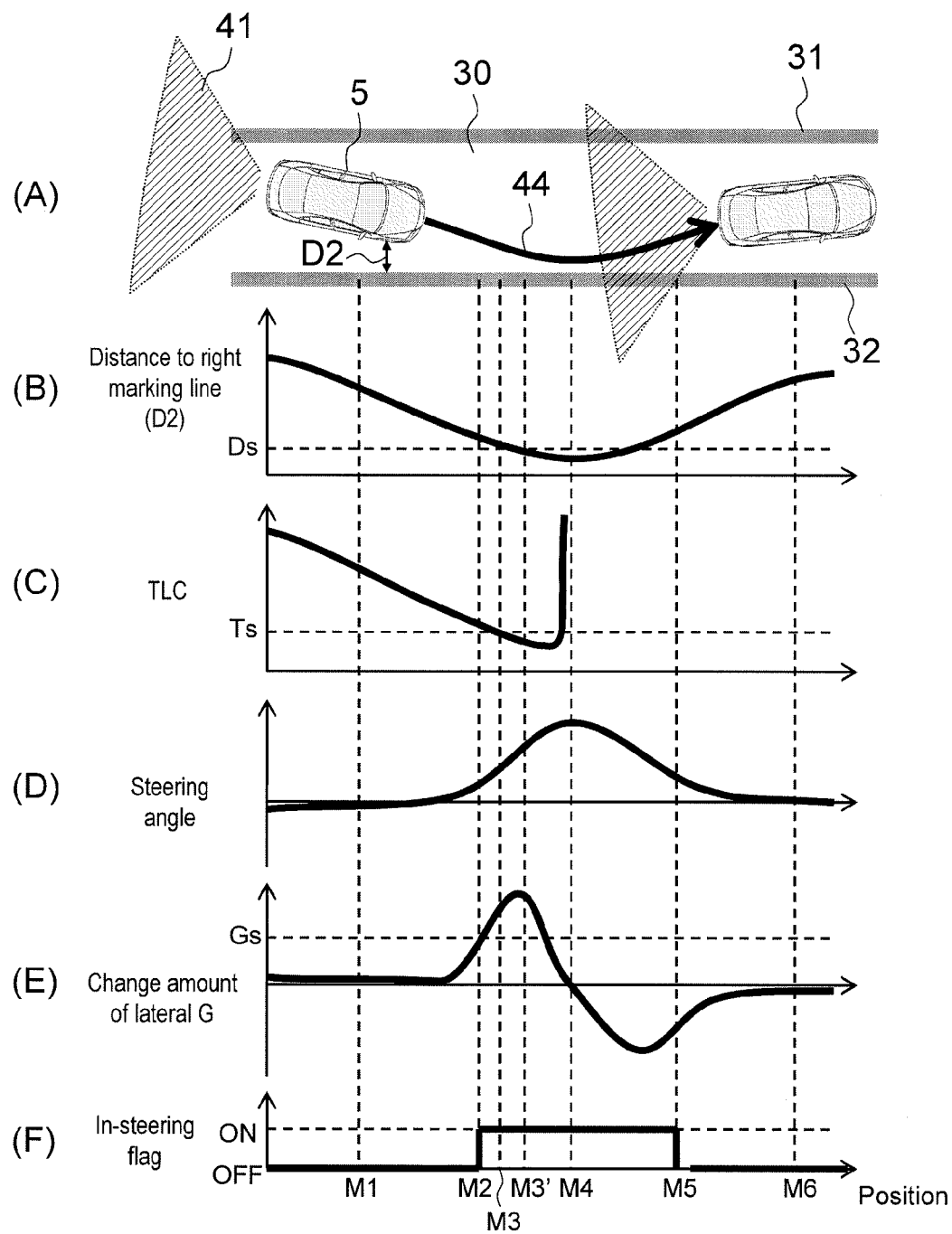
FIG. 8 is a diagram provided for explaining another example of behavior and change of each component in the first embodiment.

Descriptions will now be provided on a scene different from FIG. 7 with reference to FIG. 8.

As similar to FIG. 7(A), FIG. 8(A) illustrates a scene where the vehicle 5 is traveling along the straight road (lane) 30, but the track 44 described by the vehicle 5 is sharper than the track 43 described in the scene of FIG. 7(A).

In this scene, the situation until the vehicle 5 reaches the position M3 is the same as described in FIG. 7, and when the vehicle 5 reaches the position M3', the distance D2 to the right marking line becomes less than the threshold value Ds, so that the warning is provided in accordance with the determination based on the distance D2 to the marking line.

Thereafter, when the vehicle reaches the position M5, the determination result in Step 605 becomes "NO", and the in-steering flag becomes to OFF.

As described above, the warning issuing based on the determination using the departure time TLC at the early stage is restricted but the determination using the distance D2 to the marking line is normally executed, so that it is possible to prevent unnecessary warning in the scene in which the vehicle actually departs from the lane.

For the purpose of taking further intention of the driver into account, the threshold value Ds used for the departure determination using the distance D2 to the marking line as described in FIG. 7 and FIG. 8 may be set to be smaller if the in-steering flag is set to ON. Specifically, Step 609 and Step 611 are configured to be a different step from each other, and the threshold value Ds is set to be smaller only for Step 609. Accordingly, if the threshold value Ds is set to be smaller in the situation in FIG. 8, the distance D2 to the right marking line never becomes less than the threshold value Ds, thereby preventing unnecessary warnings. Note that, if the threshold value Ds is set to be too small, no warning will be provided in an actual departure of the vehicle, thus a careful setting should be required for the threshold value Ds.

Second Embodiment

Figure 9:
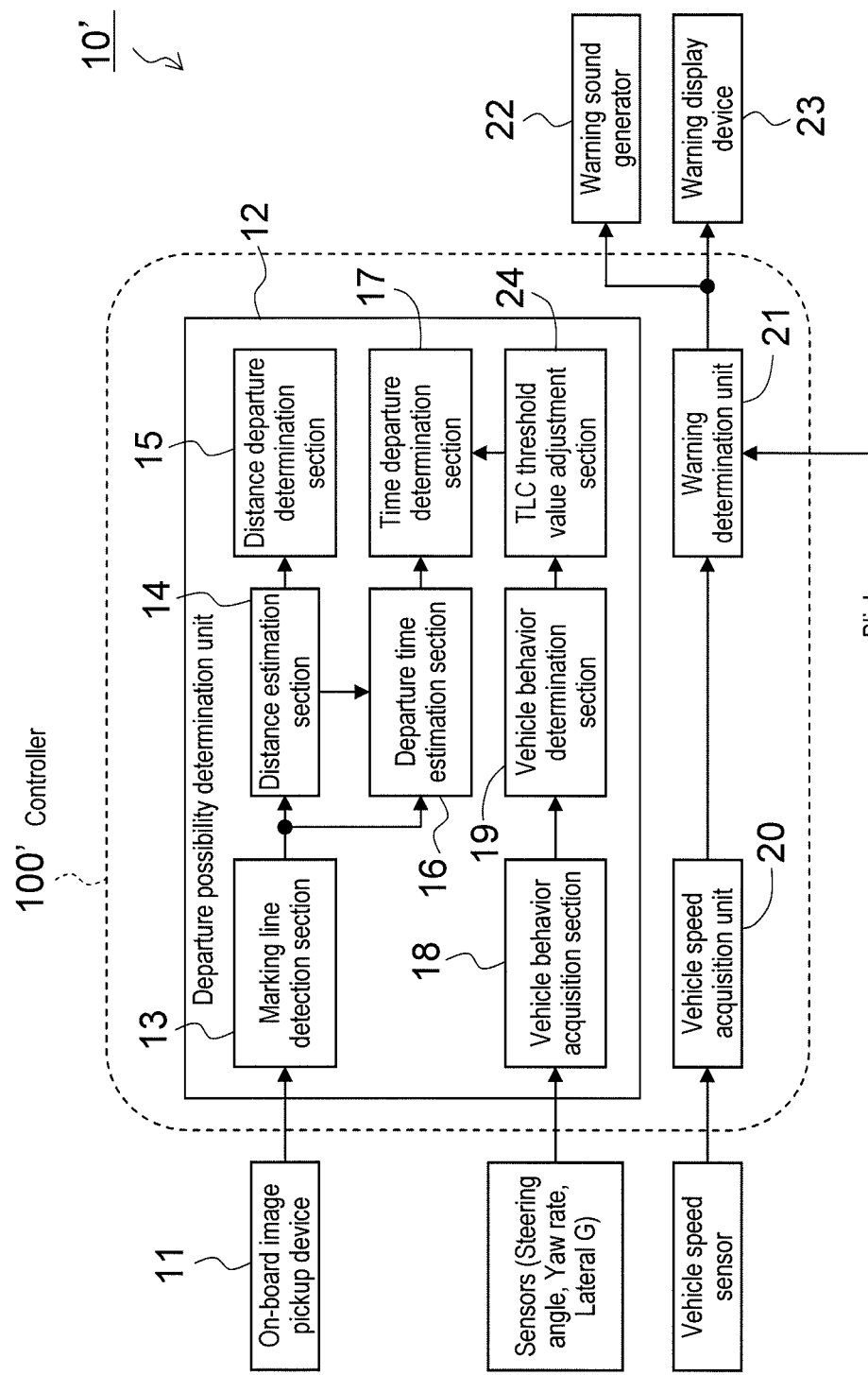
FIG. 9 is a schematic diagram illustrating the second embodiment of the lane departure warning device according to the present invention.

FIG. 9 is a schematic diagram of the lane departure warning device 10' according to the second embodiment.

The configuration of FIG. 9 further includes the TLC threshold value adjustment section 24 in the configuration of the first embodiment (FIG. 1).

The TLC threshold value adjustment section 24 adjusts the threshold value used for the departure determination on the time departure determination section 17 if the parameter regarding the steering amount of the vehicle is equal to the predetermined value or more on the vehicle behavior determination section 19.

Figure 10:
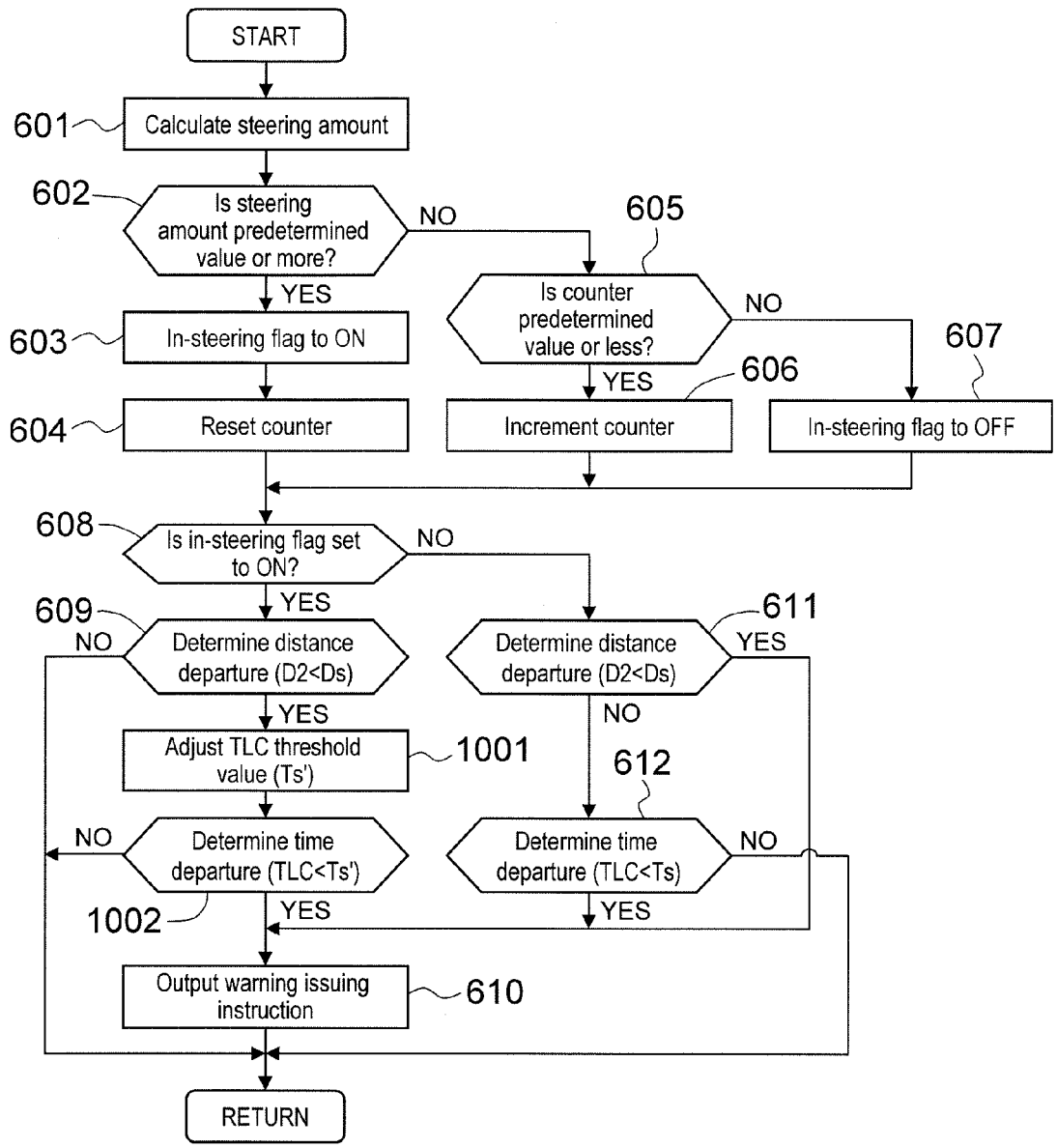
FIG. 10 is a flow chart provided for explaining one example of a lane departure possibility determination procedure according to the second embodiment.

Descriptions will now be provided on the procedure of the lane departure warning device 10' of the second embodiment with reference to the flow chart of FIG. 10.

The same reference numerals will be given to the steps (601–608) in the same process in FIG. 10 as those described in FIG. 6, and any detailed explanation will be omitted, and thus detailed descriptions will be provided only on the other steps than them.

In Step 608, it is determined whether or not the in-steering flag is set to ON, and if the in-steering flag is set to ON, the process shifts to Step 609, and if the in-steering flag is set to OFF, the process shifts to Step 611.

In Step 609, it is determined whether or not the possibility of departure is high, using the distance D2 (or D1) from the outer edge of the front wheel to the marking line estimated in Step 204 and the threshold value Ds; in Step 1001, the threshold value Ts used for the determination using the departure time TLC is adjusted into Ts' depending on the degree of the steering amount calculated in Step 601 (the threshold value Ts' is set to be smaller as the steering amount is greater). In Step 1002, it is determined to be or not to be TLC<Ts' by using the threshold value Ts' adjusted in Step 1001, and the process shifts to Step 610.

Figure 6:
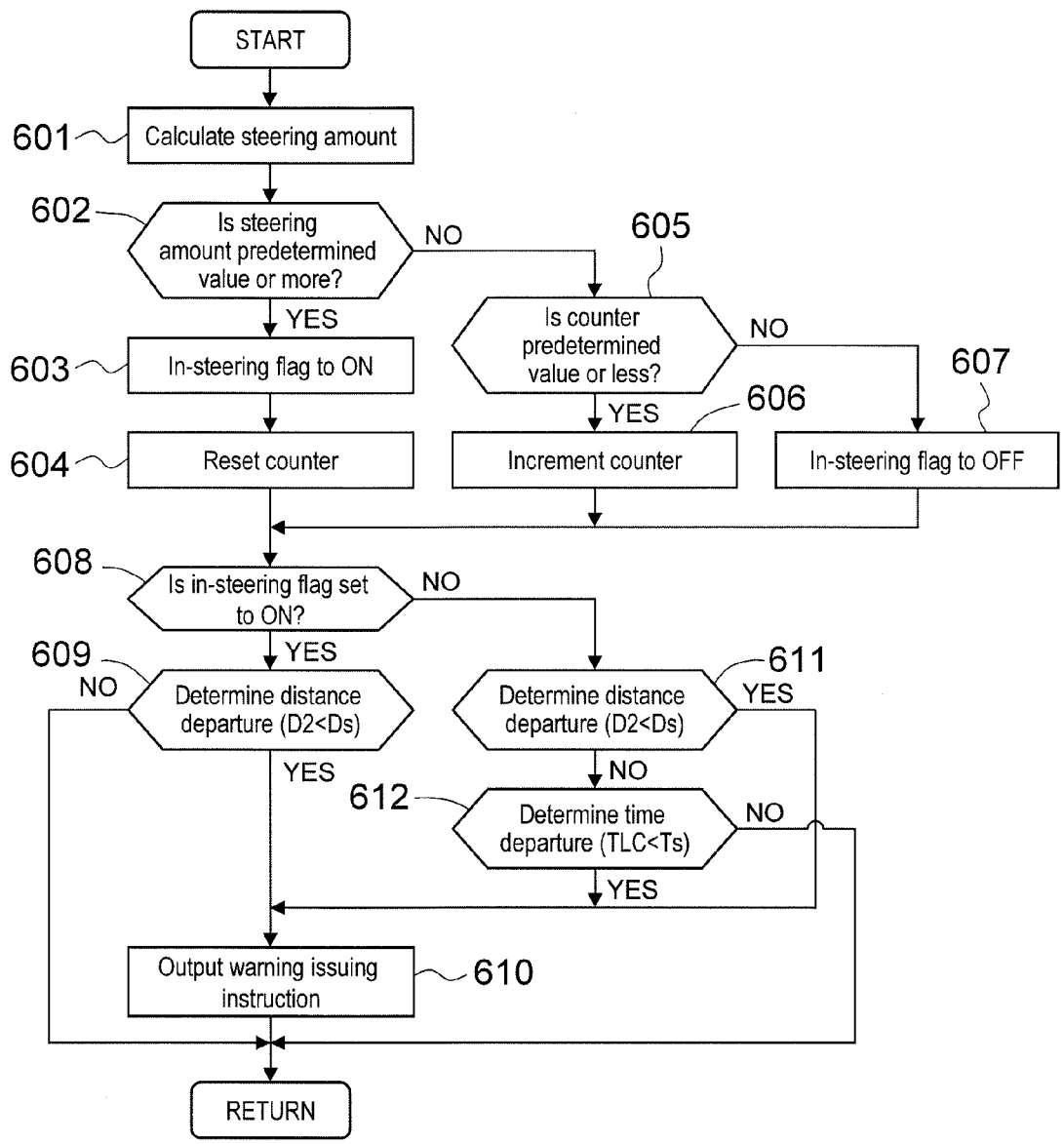
FIG. 6 is a flow chart provided for explaining one example of a lane departure possibility determination procedure according to the first embodiment.

In Steps 610, 611, 612, the same process as in the first embodiment of FIG. 6 is carried out, and then the process shifts to "Return".

Descriptions will now be provided on the present embodiment applied to the actual road conditions.

Figure 11:
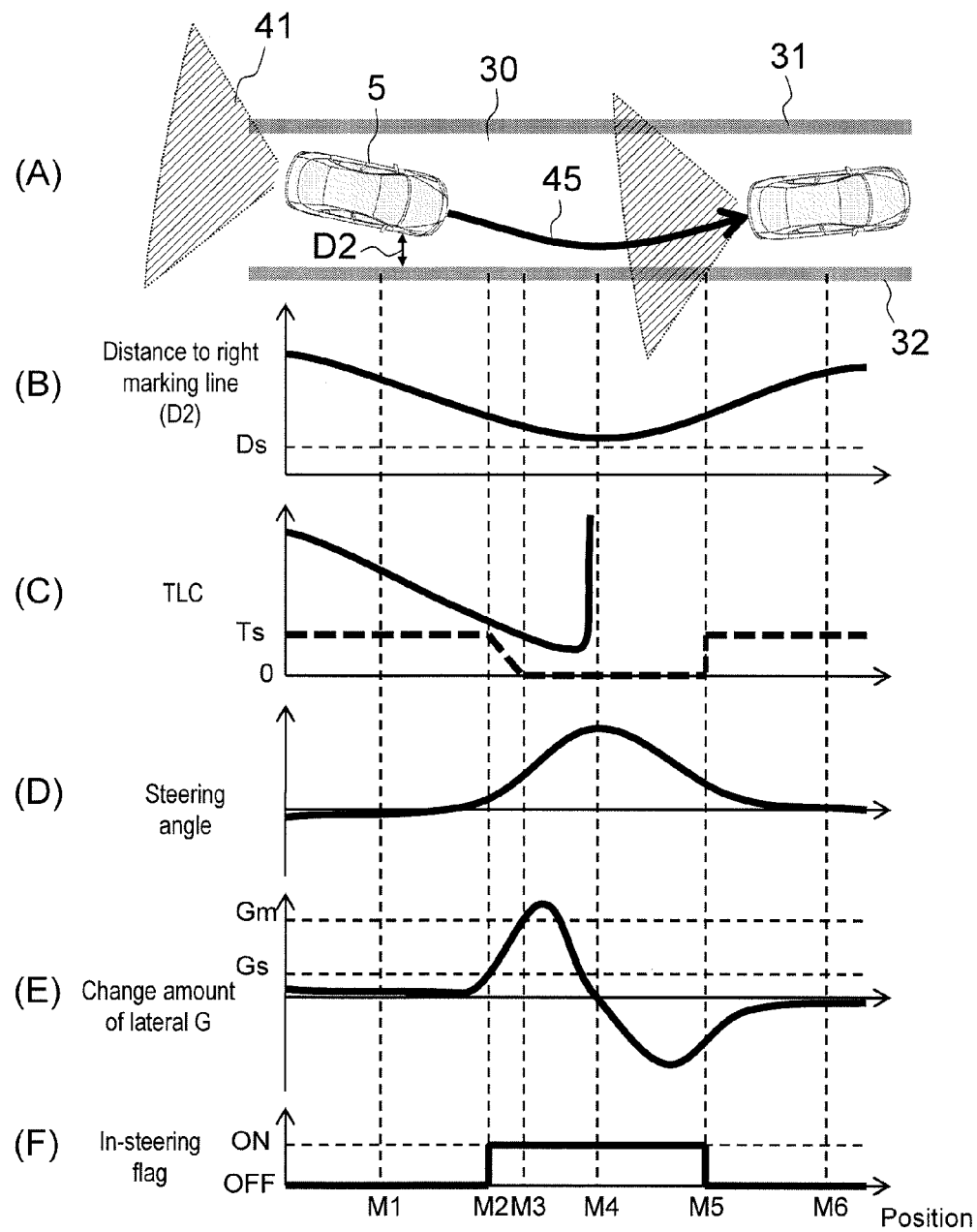
FIG. 11 is a diagram provided for explaining one example of behavior and change of each component in the second embodiment.

FIG. 11 illustrates the road conditions and how each parameter (distance to the right marking line, TLC, steering angle, change amount of lateral G, in-steering flag) changes, as similar to FIG. 7.

Gs of (E) in FIG. 11 denotes the threshold value used for determining whether or not the vehicle is in the steering state (steering amount), Gm denotes the maximum value of the change amount of the lateral G used for changing the threshold value Ts for the TLC.

When the vehicle 5 approaches the right marking line 32 and passes the position M1, both the distance D2 to the right marking line and the TLC become smaller. Thereafter, when the driver steers the vehicle so as to return inward of the lane, the steering angle starts to change, so that the change amount of the lateral G calculated using the steering angle also starts to change.

When the vehicle reaches the position M2, the change amount of the lateral G exceeds the threshold value Gs ("YES" in Step 602), and then the in-steering flag is set to ON, so that the threshold value Ts for the TLC is changed in accordance with the degree of the change amount of the lateral G if this flag is set to ON ("YES" in Step 608). Specifically, it is configured that the threshold value Ts' of the TLC is linearly reduced when the change amount of the lateral G shifts from the threshold value Gs (0.1 G/s, for example) to the threshold value Gm (0.3 G/s, for example), and the threshold value Ts' of the TLC is set to "0" if the change amount of the lateral G exceeds Gm (if the vehicle 5 reaches the position M3), thereby disabling the departure determination using the departure time TLC.

Thereafter, when the vehicle 5 reaches the position M5, the determination result in Step 605 becomes "NO", and the in-steering flag is set to OFF, and then the threshold value Ts for the TLC returns to the original value.

As described above, dynamically changing the threshold value for the TLC depending on the degree of the steering amount can maintain the function of the departure determination based on the departure time, as well as enables the departure determination based on the distance to the marking line, so that the present embodiment is applicable to various traveling patterns of the vehicle.

In the present embodiment, an example of using the image pickup device for picking up an image behind the vehicle has been explained, but an image pick up device for picking up an image in front of the vehicle may be employed, and an attachment position of the image pickup device may be different from that of the present embodiment.

As described above, the present invention may be embodied in various forms without departing from the spirit and scope of the invention.

DESCRIPTION OF SYMBOLS

5 Vehicle
10 Lane departure warning device
11 Image pickup device
12 Departure possibility determination unit
39 Lane
31, 32 Marking lines
100 Controller

What is claimed is:

1. A lane departure warning device for detecting a position of a marking line of a lane where an own vehicle is traveling, predicting a possibility that the own vehicle will depart from the lane, and providing a warning if the possibility of the departure is high, the lane departure warning device comprising:
a marking line detection section for detecting the position of the marking line based on image information acquired from an image pickup device mounted on the own vehicle;
a distance estimation section for estimating a distance from a predetermined part of the own vehicle to the marking line;
a required time estimation section for estimating a time required for the own vehicle to depart from the lane;
a vehicle behavior estimation section for estimating a steering amount of the own vehicle toward a center of the lane or amount correlating with the steering amount based on a parameter for expressing a vehicle behavior of at least one of a steering angle, a yaw rate and a lateral G;
a departure possibility determination unit for determining whether or not the possibility that the own vehicle will depart from the lane is high based on the distance from the own vehicle to the marking line that is estimated by the distance estimation section, the time required for the own vehicle to depart from the lane that is estimated by the required time estimation section, and the steering amount or the amount correlating with the steering amount that is estimated by the vehicle behavior estimation section; and
a warning generator for providing a warning if it is determined by the determination unit that the possibility that the own vehicle will depart from the lane is high.

2. The lane departure warning device according to claim 1, wherein
if it is determined that the steering amount of the own vehicle toward the center of the lane or the amount correlating with the steering amount that is estimated by the vehicle behavior estimation section is equal to a predetermined threshold value for steering amount determination or more,
the departure possibility determination unit compares the distance from the own vehicle to the marking line that is estimated by the distance estimation section to a threshold value for distance determination predetermined for the distance, so as to determine whether or not the possibility that the own vehicle will depart from the lane is high.

3. The lane departure warning device according to claim 2, wherein
if it is determined that the steering amount of the own vehicle toward the center of the lane or the amount correlating with the steering amount that is estimated by the vehicle behavior determination section is equal to a predetermined threshold value for steering amount determination or less,
the departure possibility determination unit
compares the distance from the own vehicle to the marking line that is estimated by the distance estimation section to a threshold value for distance determination predetermined for the distance, so as to determine whether or not the possibility that the own vehicle will depart from the lane is high, and
further compares the time required for the own vehicle to depart from the lane that is estimated by the required time estimation section to a threshold value for time determination predetermined for the required time, so as to determine whether or not the possibility that the own vehicle will depart from the lane is high.

4. The lane departure warning device according to claim 1, wherein
if it is determined that the steering amount of the own vehicle toward the center of the lane or the amount correlating with the steering amount that is estimated by the vehicle behavior determination section is equal to a predetermined threshold value for steering amount determination or more,
the departure possibility determination unit changes a threshold value for time determination predetermined for the time required for the own vehicle to depart from the lane that is estimated by the required time estimation section depending on the steering amount or the amount correlating with the steering amount, and compares the changed threshold value for time determination and the time required for the departure, so as to determine whether or not the possibility that the own vehicle will depart from the lane is high.

5. The lane departure warning device according to claim 1, wherein
the vehicle behavior estimation section finds the steering amount or the amount correlating with the steering amount by differentiating the parameter for expressing the vehicle behavior of at least one of the steering angle, the yaw rate and the lateral G.

6. The lane departure warning device according to claim 1, wherein
the image pickup device is mounted at a rear of the own vehicle so as to pick up an image behind the own vehicle.

* * * * *